US009317982B2

(12) United States Patent
Hartmann

(10) Patent No.: US 9,317,982 B2

(45) Date of Patent: Apr. 19, 2016

(54) ACCESS CONTROL SYSTEM AND METHOD

(71) Applicant: 2262058 ONTARIO LTD., Barrie (CA)

(72) Inventor: Andy Hartmann, Midhurst (CA)

(73) Assignee: 2262058 Ontario Ltd., Barrie (CA)

( * ) Notice: Subject to any disclaimer, the term of this patent is extended or adjusted under 35 U.S.C. 154(b) by 210 days.

(21) Appl. No.: 13/841,091

(22) Filed: Mar. 15, 2013

(65) Prior Publication Data

US 2013/0293350 A1 Nov. 7, 2013

Related U.S. Application Data

(60) Provisional application No. 61/641,104, filed on May 1, 2012.

(51) Int. Cl.

*H04Q 1/00* (2006.01)
*G07C 9/00* (2006.01)

(52) U.S. Cl.

CPC ........ *G07C 9/00111* (2013.01); *G07C 9/00031* (2013.01)

(58) Field of Classification Search

CPC ........... G06F 21/30; G07C 9/00; G08B 13/00
USPC .............. 340/5.65, 5.6, 5.2, 528, 572.1, 5.52, 340/5.7, 10.1, 13.24
See application file for complete search history.

(56) References Cited

U.S. PATENT DOCUMENTS

| | | | | |
|---|---|---|---|---|
| 8,269,602 | B2 * | 9/2012 | Graichen | 340/5.7 |
| 2008/0216156 | A1 | 9/2008 | Kosaka | |
| 2008/0272881 | A1 * | 11/2008 | Goel | 340/5.3 |
| 2010/0052928 | A1 * | 3/2010 | Tabib | 340/653 |
| 2011/0313893 | A1 * | 12/2011 | Weik, III | 705/28 |

FOREIGN PATENT DOCUMENTS

| | | |
|---|---|---|
| EP | 1488058 B1 | 9/2006 |
| WO | 0235479 A1 | 5/2002 |

* cited by examiner

*Primary Examiner* — Phung Nguyen

(74) *Attorney, Agent, or Firm* — Kolisch Hartwell, P.C.

(57) ABSTRACT

An access control system is provided for controlling access between a secured side and a non-secured side of an access control point. A reader module is disposed on the secured side of the access control point for receiving authentication data from an individual. A controller unit is disposed on the non-secured side of the access control point, and has a housing that encloses an access control panel and a request-to-exit motion sensor. The access control panel is in communication with the reader module, an electronic lock mechanism, and the request-to-exit motion sensor. In response to receiving a data signal from the reader, the access control panel determines whether or not to unlock the lock. When it is determined that the lock should be unlocked, the access control panel provides a signal to the electronic lock for switching the lock from a secured condition to a released condition.

22 Claims, 5 Drawing Sheets

ACCESS CONTROL SYSTEM AND METHOD

CROSS-REFERENCE TO RELATED APPLICATION

This application claims priority to U.S. Provisional Patent Application Ser. No. 61/641,104, filed May 1, 2012, which is hereby incorporated by reference.

FIELD OF THE INVENTION

The instant invention relates generally to access control systems and to methods for controlling access to secure areas, and more particularly to an access control system having an access control panel and a request-to-exit motion sensor co-located within a same unit.

BACKGROUND OF THE INVENTION

Locks have been used for securing gates and doors throughout most of recorded history. The oldest known lock is approximately 4,000 years old and dates to ancient Egypt. The earliest known key-based lock was built during the Assyrian Empire in Khorsabad near Nineveh in about 704 BC, and used the same pin-tumbler principle that is still employed by many modern locks. Although modern locks are far more sophisticated than their early predecessors, they nevertheless perform substantially the same function of controlling access to a secure area. In particular, access to the secure area is prevented until the lock is released using a physical object such as for instance a key, a keycard, a fingerprint, a RFID card or a security token, or by presenting secret information such as for instance a key-code or a password, etc.

Today, a lock may be either mechanical or electronic. Electronic locks may be stand-alone, with an electronic control assembly mounted directly to the lock, but more commonly electronic locks are connected to an access control system. Typical components of an access control system include a reader, a controller, a door contact and a request-to-exit device. However, it is to be understood that not all of these components are present in all access control systems and that some systems may include additional components. The reader is disposed on a secured side of a doorway, and is used for reading a token that is carried by an authorized individual. For instance, the reader is a radio frequency identification (RFID) tag reader that is capable of interrogating a RFID tag embedded within a card that is carried by the authorized individual. The reader sends a signal to the controller, based on a result of the interrogation, and the controller uses this signal to determine whether or not to unlock the door. Similarly, the door contact is in communication with the controller for providing a signal thereto when the door is opened—known as an event. In order to avoid logging an event every time someone exits through the doorway, it is common practice to provide a request-to-exit device on the non-secured side of the door. The request-to-exit device is typically a button or a motion sensor, and it is activated prior to an individual exiting through the doorway so that when the door is subsequently opened the system does not interpret this as a forced-door event.

In a traditional access control system the controller is disposed in an electrical room, and the readers, locks, door contacts and request-to-exit devices that are installed at each door are all wired back to the controller. Different controllers are used to control different groups of doors, and these controllers also communicate over a network with a central server or with a similar processing unit. Unfortunately, in this type of system it is necessary to install multiple runs of cable from each doorway to the controller in the electrical room. This type of system is difficult to configure and troubleshoot, particularly if the system is installed in a large building with dozens or even hundreds of doors. Further, a vast quantity of copper wiring is required to connect the controller to the readers, locks, door contacts, and request-to-exit devices at each door, sometimes over very long runs, which increases the both the material cost and labor cost associated with the installation of such systems.

More recently, Power over Ethernet (PoE) systems have emerged in which the access control panel is mounted at the door and a single Category 5 (Cat 5) network cable is pulled to the access control panel at the door. The reader, lock, door contact, request-to-exit device, etc. are all connected directly to the access control panel, which is a PoE device, via short runs of copper wire, thereby eliminating the multiple runs of wiring from the central server to each door. Advantageously, decisions are made at the access control panel, and as such each door may continue to operate even if communication with the server is not possible. Communication between the central server and the access control panel is required only during initial configuration, and to update firmware or modify a set of access control rules, etc. Of course, each access control panel includes on-board memory for storing an event log, which may be dumped to the central server according to predetermined criteria.

The main disadvantage that is associated with PoE systems is related to the need to provide an access control panel at each door. Firstly, the access control panel adds to the number of system components that has to be installed at every door, which increases both the material cost and the labor cost of installing this type of system. Further, there may not be a suitable location for installing all of the components of this type of system at every door, and even if suitable locations can be found for all of the components, it is unlikely that the layout can be standardized for a large number of doors. Two types of systems have emerged that are based on this general architecture, and which differ primarily with respect to the placement of the access control panel at the door.

In the first type of system the access control panel is incorporated within the housing of the reader. Unfortunately, several significant disadvantages are associated with this approach. A first disadvantage is that since the decision-making components of the access control panel must be accommodated within the reader housing, the readers are necessarily larger and bulkier compared to the sleeker design that is available in the reader-only format. Even so, due to the limited amount of space that is available within the housing, on-board diagnostic systems for detecting the state of inputs, outputs, communication ports and so forth are virtually non-existent. In order to trouble shoot this type of system the reader must be removed from the wall, so as to allow the technician to gain access to the wires and connections inside the housing. A second and perhaps more serious disadvantage is that the reader, and therefore also the access control panel, is necessarily disposed on the secured side of the door, which makes it susceptible to being tampered with. Even without knowledge about how a specific system works, it is possible for an individual to remove the reader housing and cause the access control panel to unlock the door merely by trial and error. Thus, in order to make the door truly secure it is necessary to add a separate module to the system, which is placed on the non-secured side of the door for controlling the lock mechanism of the door. Of course, this solution adds extra wiring, requires additional components, and largely defeats the purpose of providing an all-in-one reader/controller design.

In the second type of system the access control panel is mounted within a dedicated enclosure. Of course, the installer must find a suitable place to mount the enclosure at each doorway, which often winds up being within the space above the ceiling. Unfortunately, positioning the access control panel within the ceiling space leads to a number of disadvantages. Firstly, it is difficult for a technician to trouble shoot the access control panel since it is located out of reach and within a dark and dusty space with little room to work in. The technician will likely need to balance on a ladder and use a work light during troubleshooting. Secondly, if the access control panel is installed within the ceiling space then the dedicated enclosure may need to be fire rated. It is yet another disadvantage that often there is no space above the ceiling, which makes it problematic to find a suitable location to mount the access control panel. In such cases it may be necessary to mount the access control panel in plain sight, which is aesthetically unappealing, or back in an electrical room, which defeats the purpose of the PoE product. Furthermore, since each doorway may have associated therewith a reader, a door contact, an electronic lock, a request-to-exit device and a separate access control panel, the amount of circuitry that is involved with this system and the power requirements thereof is relatively high.

It would therefore be advantageous to provide a method and system that overcomes at least some of the above-mentioned limitations of the prior art.

SUMMARY OF EMBODIMENTS OF THE INVENTIONS

In accordance with an aspect of the invention there is provided an access control system for controlling access between a secured side of an access control point and a non-secured side of the access control point, the system comprising: a reader module disposed on the secured side of the access control point, the reader module for receiving authentication data from an individual; an electronic lock mechanism operable between a secured condition and a released condition, wherein access between the secured side of the access control point and the non-secured side of the access control point is controllably provided by switching the electronic lock mechanism from the secured condition to the released condition; and a controller unit disposed on the non-secured side of the access control point, the controller unit having a housing that encloses an access control panel and a request-to-exit motion sensor, the access control panel in communication with each one of the reader module, the electronic lock mechanism and the request-to-exit motion sensor.

In accordance with an aspect of the invention there is provided a controller unit for an access control system, comprising: a base portion having a mounting structure for securing the controller unit to a surface at a location proximate an access control point; circuitry defining an access control panel and a request-to-exit motion sensor, the circuitry being secured to the base portion, and the circuitry that defines the access control panel including communication ports for supporting communication with peripheral devices of the access control system; and a cover portion that is detachably secured to the base portion and that encloses the circuitry defining the access control panel and the request-to-exit motion sensor.

In accordance with an aspect of the invention there is provided a method for controlling access between a secured side of an access control point and a non-secured side of the access control point, comprising: providing a reader on the secured side of the access control point for receiving authentication data from an individual; providing a local controller assembly on the non-secured side of the access control point, wherein the local controller assembly comprises an access control panel and a request-to-exit motion sensor housed within a same housing; transmitting from the reader to the access control panel a data signal including reader data relating to the authentication data that is received from the individual; using the access control panel, determining if the individual is authorized to enter the non-secured side of the access control point based on the reader data; and when it is determined that the individual is authorized to enter the non-secured side of the access control point, providing a control signal from the access control panel to an electronic lock mechanism of the access control point, the control signal for changing the lock mechanism from a secured condition to a released condition.

BRIEF DESCRIPTION OF THE DRAWINGS

Exemplary embodiments of the invention will now be described in conjunction with the following drawings, wherein similar reference numerals denote similar elements throughout the several views, in which.

DETAILED DESCRIPTION OF EMBODIMENTS OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein.

In this document, the term "secured side" refers to the side of an access control point on which an individual is required to present a keycard or another physical object, and/or is required to enter an access code, in order to unlock a lock and enter a controlled access area on the other side of the access control point. The term "non-secured side" refers to the other side of the access control point, and is also referred to as the controlled access area. The individual may or may not be required to present a keycard or another physical object, and/or may or may not be required to enter an access code or provide a biometric sample, in order to unlock the lock and leave the controlled access area on the "non-secured side."

Figure 1:
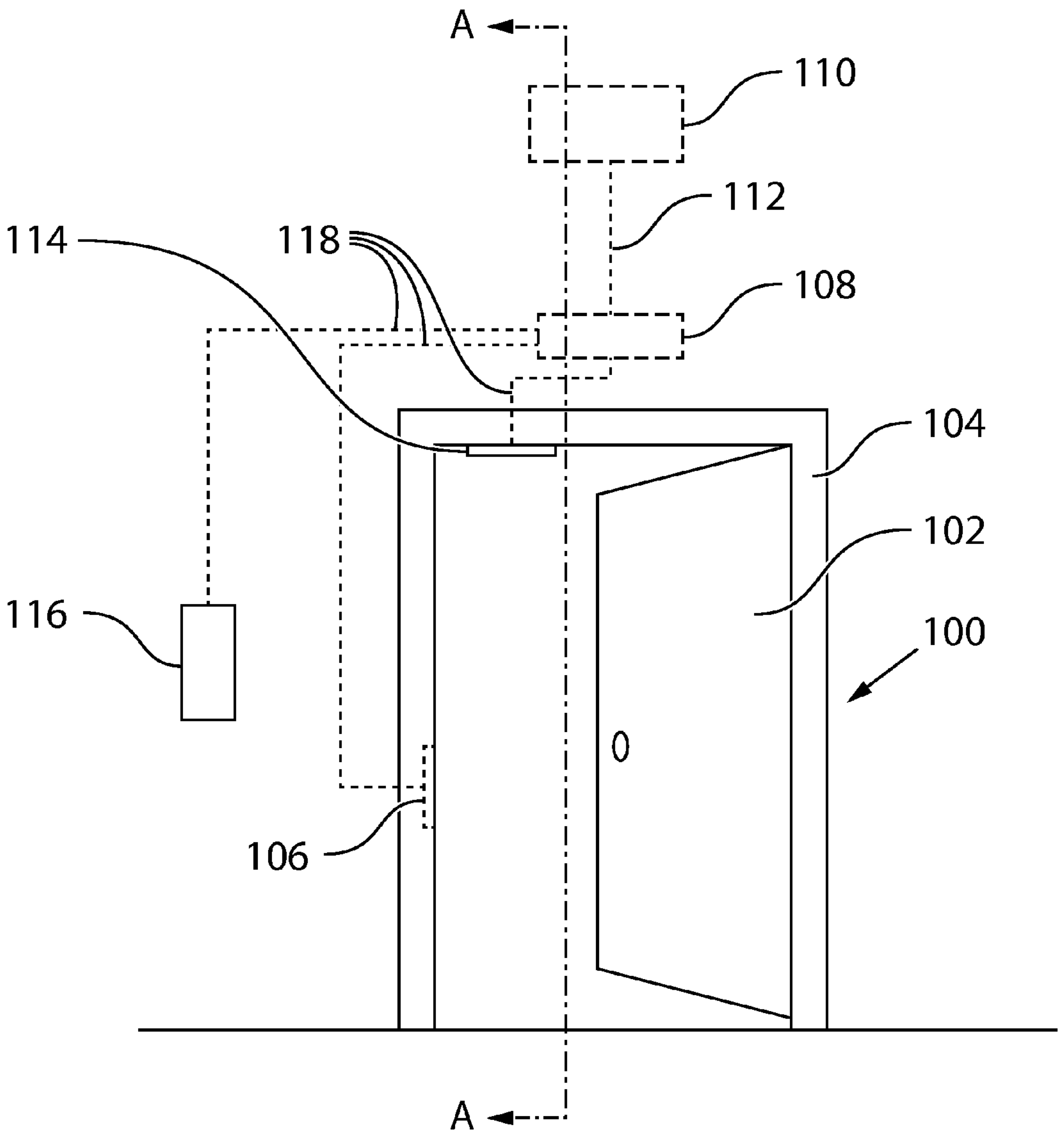
FIG. 1 is a simplified perspective view showing an access control system according to an embodiment of the instant invention, installed proximate an access control point.

Referring to FIG. 1, shown is an access control system in accordance with an embodiment of the instant invention. FIG. 1 shows the components of the access control system from the viewpoint of a person who is standing on the secured side of the access control point. Those items in the drawing that are shown using dashed lines are either inside the wall space, or they are located on the non-secured side of the access control point, and they are not visible from the viewpoint that is used in FIG. 1. In this specific and non-limiting example, the access control point is a doorway 100 with a door panel 102 that swings between an open position (illustrated) and a closed position (not illustrated). For instance, the door panel 102 is mounted to a frame 104 of the doorway 100 using not illustrated hinges. An electronic lock 106 is provided at the doorway 100 for controlling access through the access control point. In particular, when the door panel 102 is in the closed position the electronic lock is operable between a secured condition for preventing access via the access control point and a released condition for supporting access via the access control point. More particularly, the electronic lock 106 secures the door panel 102 in its closed position when the electronic lock 106 is in the secured condition—its resting state. Switching the electronic lock 106 from the secured condition to the released condition allows the door panel to swing open.

A controller unit 108 is provided on the non-secured side of the access control point. The controller unit 108, which is described in greater detail with reference to FIGS. 3*a* and 3*b*, comprises circuitry defining an access control panel (not shown in FIG. 1) and a request-to-exit motion sensor (also not shown in FIG. 1). The access control panel is a Power over Ethernet (PoE) device, which is connected to a router 110 via a PoE cable, such as for instance a Category 5 (Cat 5) cable 112. Additionally, the access control panel of the controller unit 108 is wired to a door contact 114 and to a reader 116, as well as to the electronic lock 106, via short runs of wiring 118. By way of a specific and non-limiting example, the reader 116 is a radio frequency identification (RFID) tag reader that is capable of interrogating a RFID tag that is embedded within a card that is carried by the authorized individual. Optionally, the RFID tag is a passive tag or the RFID tag is an active tag. Alternatively, the reader 116 is another type of reader, such as for instance a biometric information reader, a magnetic stripe reader, a keypad, etc.

It should be noted that the access control system that is shown in FIG. 1 is for controlling a single access control point, i.e. doorway 100. As will be apparent, a large building with many doorways will require many such access control systems, each system having a dedicated access control panel. The access control panels are in communication with a not illustrated central server, such as for instance via the router 110. The central server is used to set up the access control systems at the time of installation, and to update periodically the programming or firmware of the access control panels, etc. Further, the central server maintains a database of authorized individuals as well as a log of events that occur at the different access control points. Optionally, the party that controls the access control points also manages the central server, or the central server is managed by a third party and may be located off-site, in another city or even another country.

Figure 2:
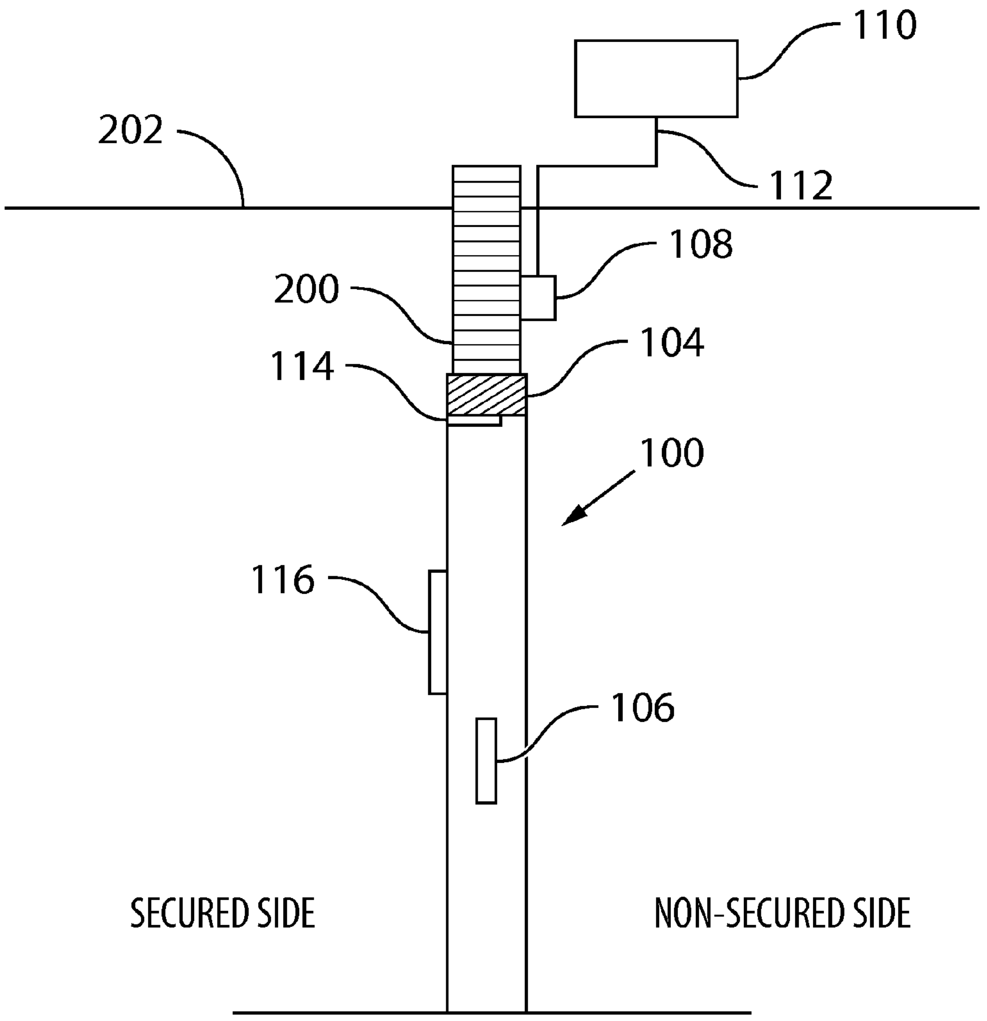
FIG. 2 is a simplified cross-sectional side of the system of FIG. 1.

Referring also to FIG. 2, shown is a side cross-sectional view of the access control point of FIG. 1, taken along the dash-dot line A-A. As is shown most clearly in FIG. 2 the controller unit 108 is mounted to a surface of the wall 200 that is vertically above, and in horizontal alignment with, the doorway 100. In the specific and non-limiting example that is shown in FIG. 2, the router 110 is located in the space above the ceiling 202. Optionally, the router is located in a service room or in another suitable location.

During use the electronic lock 106 secures the door panel 102 in its closed position, such that access between the secured side and the non-secured side of the access control point is prevented. When an individual presents a keycard or other physical object to the reader 116 on the secured side, the reader 116 reads the information that is stored on the keycard, and then transmits a data signal to the access control panel of the controller unit 108. The access control panel receives the data signal and determines whether or not to unlock the electronic look 106. For instance, the data signal comprises authentication information for being compared to template data that is stored within a memory portion of the access control panel. If the determination is indicative of an authentication, then the access control panel provides a command signal to the electronic lock 106, and in response to receiving the command signal the electronic lock 106 switches from the secured condition to the released condition. The individual opens the door and enters the non-secured side of the access control point, and optionally the access control panel logs an event. Of course, if the determination is other than indicative of an authentication, then the access control panel does not provide a command signal to the electronic lock 106, and the electronic lock 106 remains in the secured condition. In this specific and non-limiting example, the individual presents a physical object, such as a keycard, to the reader 116. Optionally, the reader 116 is a keypad and the individual inputs a secret access code.

When the individual subsequently wishes to leave the non-secured side of the access control point, and upon approaching within a sensing distance of the request-to-exit motion sensor, an exit signal is transmitted from the request-to-exit motion sensor to the access control panel. Upon receiving the exit signal, the access control panel provides a command signal to the electronic lock 106, and in response to receiving the command signal the electronic lock 106 switches from the secured condition to the released condition. The individual opens the door and leaves the non-secured side of the access control point. Since the request-to-exit motion sensor provided a signal indicative of the individual approaching the access control point on the non-secured side thereof, the access control panel does not log a forced door event in response to receiving a signal from the door contact 114 when the door panel 102 is opened.

Figure 3A:
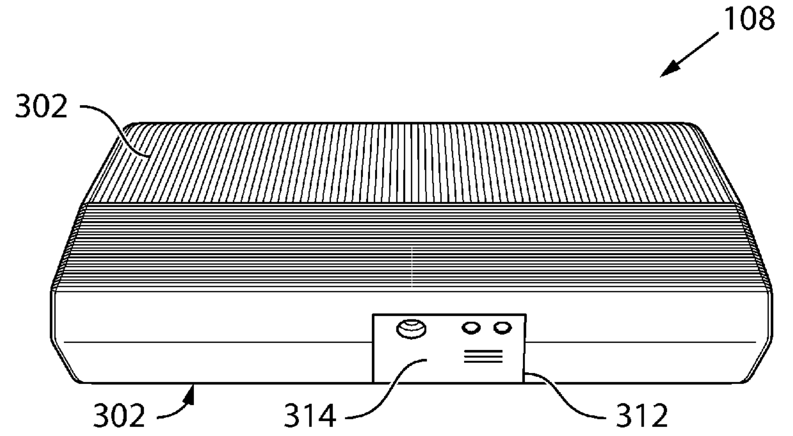
FIG. 3*a* is a perspective view of a controller unit according to an embodiment of the instant invention, shown in an assembled condition.
Figure 3B:
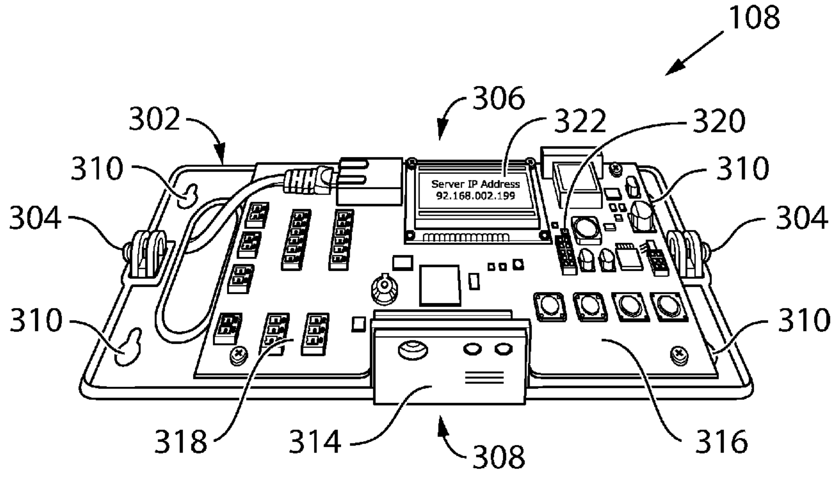
FIG. 3*b* is a perspective view of the controller unit of FIG. 3*b*, shown in a disassembled condition.

Referring now to FIGS. 3*a* and 3*b*, shown are perspective views of the controller unit 108 in an assembled condition and in a disassembled condition, respectively. The controller unit 108 includes a cover portion 300 that is detachably secured to a base portion 302. For instance, screws 304 are used to detachably secure the cover portion 300 to the base portion 302. The cover portion 300 and the base portion are fabricated from a suitable material, such as for instance molded plastic. The cover portion 300 encloses circuitry that is secured to the base portion 302. The circuitry defines the access control panel, shown generally at 306, and the request-to-exit motion sensor, shown generally at 308. The base portion 302 includes a mounting structure, such as for instance a plurality of keyhole slots 310, for use in securing the controller unit 108 to a surface proximate the access control point. A recess 312 along one edge of the cover portion 300 accommodates a sensing portion 314 of the request-to-exit motion sensor 308. The base 302 also has an opening for accommodating one end of a network cable, which connects to the access control panel 306.

The base portion 302 of the controller unit 108 provides a support surface that is sufficiently large to accommodate processing circuitry 316, communication ports 318, LED indicators 320 and an alphanumeric display, such as for instance a two-line LCD display 322. The above-noted circuitry defines the access control panel 306, and supports respectively decision making and control functions, communication with peripherals and the central server, diagnostics functions, and servicing/diagnostics functions. The cover portion 300 is dimensioned to mate with the base portion 304, being fastened thereto via screws 304, and to accommodate the above-noted circuitry.

Figure 4:
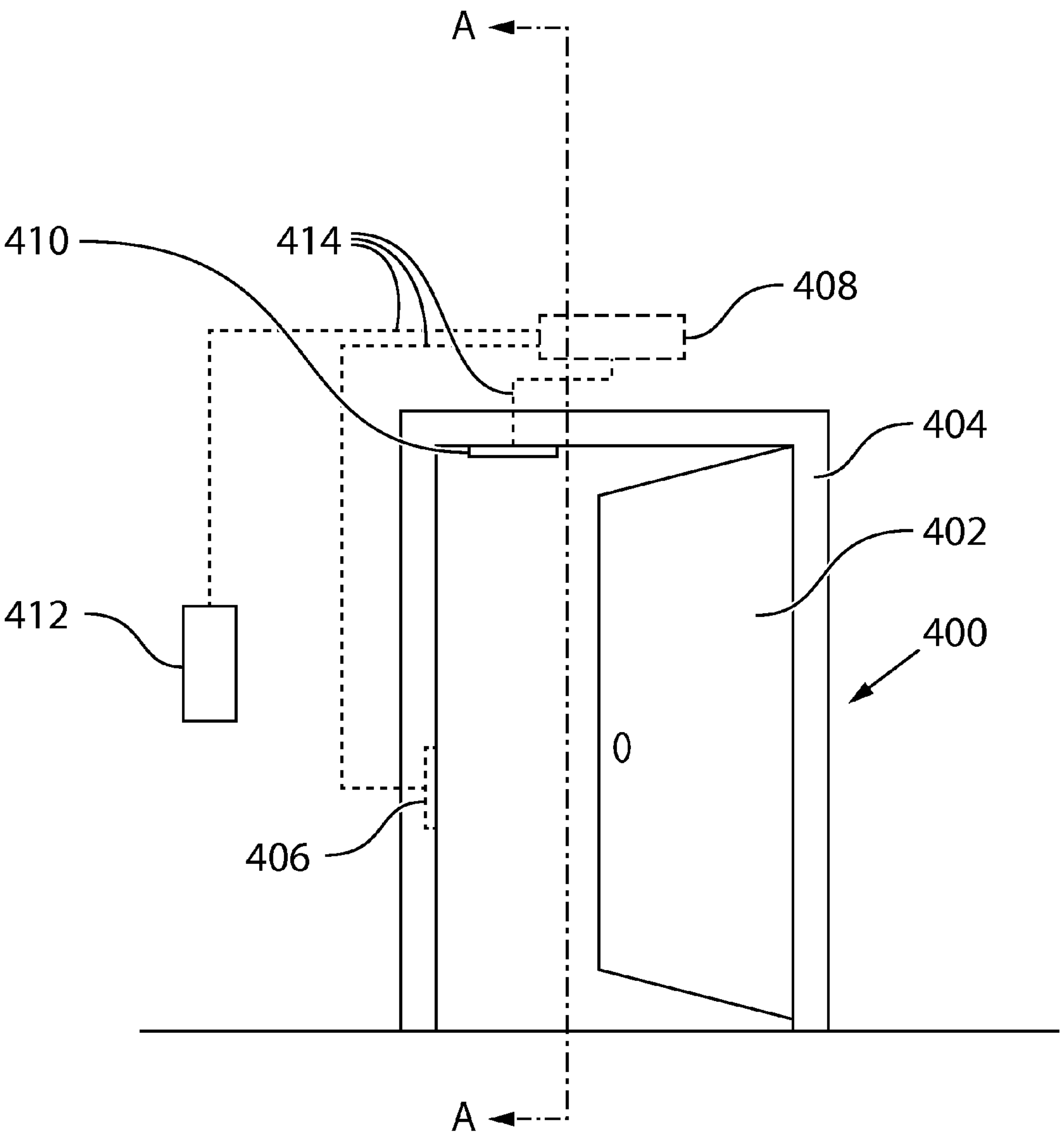
FIG. 4 is a simplified perspective view showing another access control system according to an embodiment of the instant invention, installed proximate an access control point.

Referring now to FIG. 4, shown is another access control system in accordance with an embodiment of the instant invention. FIG. 4 shows the components of the access control system from the viewpoint of a person who is standing on the secured side of the access control point. Those items in the drawing that are shown using dashed lines are either inside the wall space, or they are located on the non-secured side of the access control point, and they are not visible from the viewpoint that is used in FIG. 4. In this specific and non-limiting example, the access control point is a doorway 400 with a door panel 402 that swings between an open position (illustrated) and a closed position (not illustrated). For instance, the door panel 402 is mounted to a frame 404 of the doorway 400 using not illustrated hinges. An electronic lock 406 is provided at the doorway 400 for controlling access through the access control point. In particular, when the door panel 402 is in the closed position the electronic lock is operable between a secured condition for preventing access via the access control point and a released condition for supporting access via the access control point. More particularly, the electronic lock 406 secures the door panel 402 in its closed position when the electronic lock 406 is in the secured condition—its resting state. Switching the electronic lock 406 from the secured condition to the released condition allows the door panel to swing open.

A controller unit 408 is provided on the non-secured side of the access control point, and is similar to the controller unit 108 that is described above with reference to FIGS. 3*a* and 3*b*. In particular, the controller unit 408 comprises circuitry defining an access control panel (not shown in FIG. 4) and a request-to-exit motion sensor (also not shown in FIG. 4). However, unlike the access control panel of the controller unit 108, the access control panel of the controller unit 408 is not a PoE device. For instance, the controller unit 408 is a stand-alone device in a single door application. In this case, the controller unit 408 may be attached to a network and web browser directly, in order to set up the access control system at the time of installation, and thereafter as needed to update the programming or firmware of the access control panel, etc. Alternatively, the access control panel of the controller unit 408 is in wireless communication with a server, or it is in communication with a server via a RS 422 bus etc., such as for instance in applications in which multiple doors are controlled or multiple controllers are provided.

Referring still to FIG. 4, the access control panel of the controller unit 408 is wired to a door contact 410 and to a reader 412, as well as to the electronic lock 406, via short runs of wiring 414. By way of a specific and non-limiting example, the reader 412 is a radio frequency identification (RFID) tag reader that is capable of interrogating a RFID tag that is embedded within a card that is carried by the authorized individual. Optionally, the RFID tag is a passive tag or the RFID tag is an active tag. Alternatively, the reader 412 is another type of reader, such as for instance a biometric information reader, a magnetic stripe reader, a keypad, etc.

Figure 5:
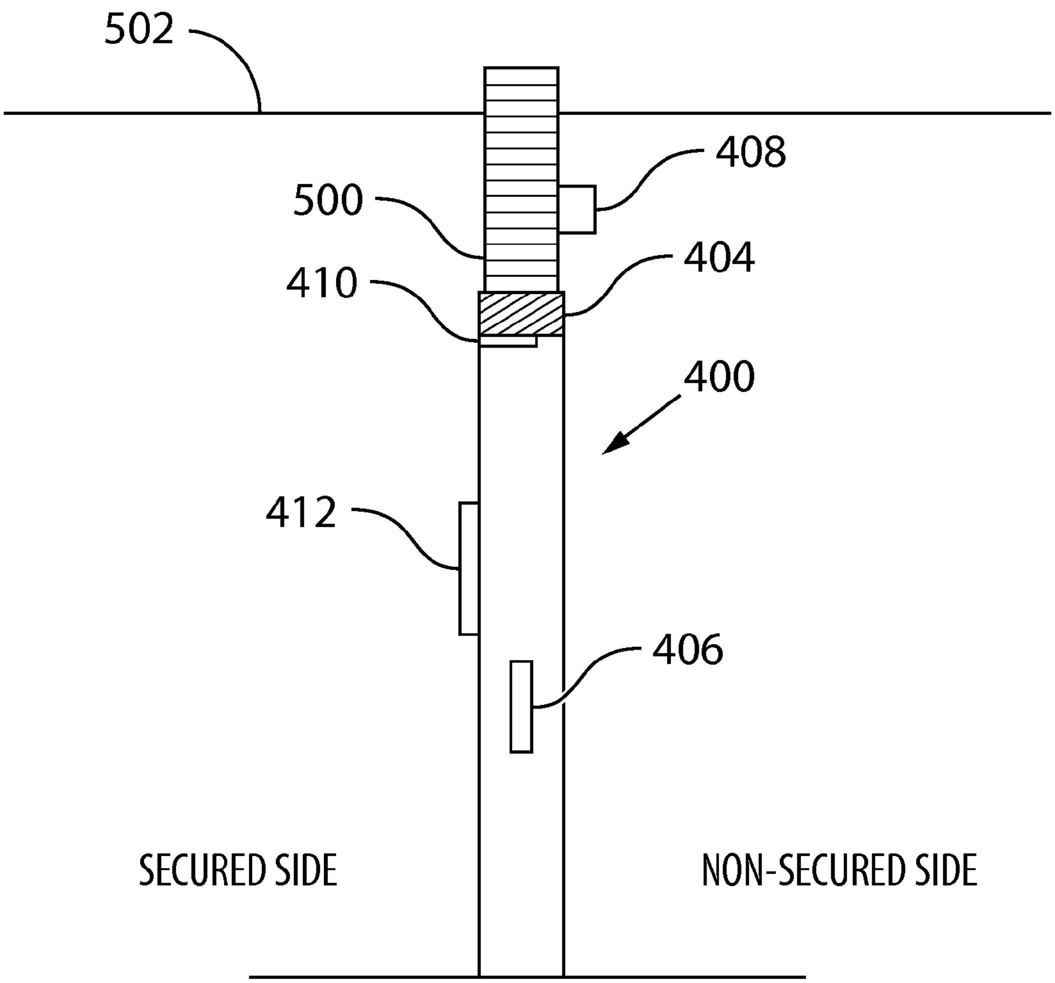
FIG. 5 is a simplified cross-sectional side of the system of FIG. 4.

Referring also to FIG. 5, shown is a side cross-sectional view of the access control point of FIG. 4, taken along the dash-dot line A-A. As is shown most clearly in FIG. 2 the controller unit 408 is mounted to a surface of the wall 500 that is vertically above, and in horizontal alignment with, the doorway 400.

During use the electronic lock 406 secures the door panel 402 in its closed position, such that access between the secured side and the non-secured side of the access control point is prevented. When an individual presents a keycard or other physical object to the reader 412 on the secured side of the access control point, the reader 412 reads the information that is stored on the keycard, and then transmits a data signal to the access control panel of the controller unit 408. The access control panel receives the data signal and determines whether or not to unlock the electronic look 406. For instance, the data signal comprises authentication information for being compared to template data that is stored within a memory portion of the access control panel. If the determination is indicative of an authentication, then the access control panel provides a command signal to the electronic lock 406, and in response to receiving the command signal the electronic lock 406 switches from the secured condition to the released condition. The individual opens the door and enters the non-secured side of the access control point, and optionally the access control panel logs an event. Of course, if the determination is other than indicative of an authentication, then the access control panel does not provide a command signal to the electronic lock 406, and the electronic lock 406 remains in the secured condition. In this specific and non-limiting example, the individual presents a physical object, such as a keycard, to the reader 412. Optionally, the reader 412 is a keypad and the individual inputs a secret access code.

When the individual subsequently wishes to leave the non-secured side of the access control point, and upon approaching within a sensing distance of the request-to-exit motion sensor, an exit signal is transmitted from the request-to-exit motion sensor to the access control panel. Upon receiving the exit signal, the access control panel provides a command signal to the electronic lock 406, and in response to receiving the command signal the electronic lock 406 switches from the secured condition to the released condition. The individual opens the door and leaves the non-secured side of the access control point. Since the request-to-exit motion sensor provided a signal indicative of the individual approaching the access control point on the non-secured side thereof, the access control panel does not log a forced door event in response to receiving a signal from the door contact 410 when the door panel 402 is opened.

Several advantages are associated with the controller units 108 and 408, and with access control systems that are based on the controller units 108 and 408. For instance, the controller unit 108/408 it is not susceptible to being tampered with by an individual who is attempting to force the door open without having proper authorization, since it is located on the non-secured side of the access control point. Since it is not susceptible to being tampered with, the cover portion may be fabricated from inexpensive materials and detachably secured to the base portion using only a pair of screws, or it may be fabricated so as to snap-fit to the base portion. These features reduce material cost compared to the reader/controller modules that are known in the prior art, which must be fabricated using tamper-resistant materials and mounting systems, and also reduce the initial cost of installing the system. In addition, servicing is facilitated since (in this example) a technician is required to loosen only two screws in order to access the circuitry inside the controller unit 108/408, which is accomplished quickly and requires only simple tools. In addition, since the request-to-exit motion sensor is attached to the circuitry of the access control panel, much of the circuitry that is required in a stand-alone request-to-exit motion sensor is redundant. As such, the controller unit 108/408 contains much less circuitry than is required to provide similar functionality using a stand-alone request-to-exit motion sensor and a separate access control panel. Reducing the amount of circuitry further reduces the material cost and the complexity of the system. Of course, reducing the amount of circuitry also reduces the overall power requirement when the system is in operation.

It is another advantage that the controller unit 108/408 is located near the top of the frame 104/404 of the doorway 100/400, making it easily accessible when servicing is required. Unlike the known systems in which the control panel is a separate module, the controller unit 108/408 is not located within the dark and confined space above the ceiling 202/502. In contrast, the controller unit 108/408 is always mounted below the ceiling where lighting conditions are good and there is room to work. Since the technician knows that the control access panel is located within the controller unit 108/408, there is no wasted time searching through ceiling spaces or attempting to follow wiring back to an electrical room when the control access system requires servicing.

Further, the controller unit 108/408 minimizes the amount of clutter that is present at the access control point since both the access control panel and the request-to-exit motion sensor are housed in a single module. Providing the access control panel and the request-to-exit motion sensor in a single module improves aesthetic appeal at the access control point. In fact, an individual passing through the doorway 100/400 would be unaware that an access control panel is located at the access control point, since the controller unit 108/408 is visually indistinguishable from a stand-alone request-to-exit motion sensor. Further still, this arrangement facilitates installation of the access control system compared to the known systems in which the control panel is provided as a separate module. In particular, it is necessary for the installer to locate only one suitable space to mount the controller unit 108/408 instead of plural spaces to accommodate an access control panel and a separate request-to-exit motion sensor. It is also necessary for the installer to mount only one module, instead of having to mount an access control panel and then separately mount a request-to-exit motion sensor and then wire together the separate components, which is far more time consuming.

It is yet another advantage of the controller unit 108/408 that the fine-tuning of the request-to-exit motion sensor is simplified. Stand-alone request-to-exit motion sensors, which are used in known systems, merely provide dry contact outputs to integrate with the access system. As such, in order to fine-tune the stand-alone motion sensor a technician must use a screwdriver and make physical adjustments to components of the sensor for varying sensitivity, hold time, frequency etc. This is a time-intensive process, which requires the technician to go to each device that requires fine-tuning, access each device, and make the necessary physical adjustments to each device, one device at a time. In contradistinction, the controller unit 108/408 includes a request-to-exit motion sensor that is integrated with an access control panel, which allows the fine-tuning of the request-to-exit motion sensor to be performed using software. When the fine-tuning is performed from a central location, there is no need for the technician to go to each of the devices or make physical adjustments to the components of the device.

Finally, even in systems that employ a second reader or a request-to-exit button on the non-secured side, the request-to-exit motion sensor that is incorporated into the controller unit 108/408 still serves a useful function. In particular, the motion sensor provides a way of confirming the presence of an individual on the non-secured side of the access control point at the time the second reader or button is activated.

Numerous other embodiments may be envisaged without departing from the scope of the invention.

What is claimed is:

1. An access control system for controlling access between a secured side of an access control point and a non-secured side of the access control point, the system comprising:

a reader module disposed on the secured side of the access control point, the reader module for receiving authentication data from an individual;

an electronic lock mechanism operable between a secured condition and a released condition, wherein access between the secured side of the access control point and the non-secured side of the access control point is controllably provided by switching the electronic lock mechanism from the secured condition to the released condition; and a controller unit disposed on the non-secured side of the access control point, the controller unit having a housing that encloses an access control panel and a request-to-exit motion sensor, the access control panel in communication with each one of the reader module, the electronic lock mechanism and the request-to-exit motion sensor.

2. The system of claim 1 wherein the access control point is a doorway having a door panel, and wherein the controller unit is disposed vertically above the doorway and is approximately horizontally aligned therewith.

3. The system of claim 1 wherein the access control panel is a Power over Ethernet (PoE) device.

4. The system of claim 1 wherein the dimensions of the controller unit are substantially the same as the dimensions of a stand-alone request-to-exit motion sensor.

5. The system of claim 1 wherein the housing comprises a base portion that supports circuitry defining the access control panel and circuitry defining the request-to-exit motion sensor, and a cover portion that is detachably mountable to the base portion.

6. The system of claim 1 wherein the access control panel comprises a display portion for providing human intelligible diagnostic messages relating to a status of the system.

7. The system of claim 1 wherein the access control panel comprises a memory portion for storing an event log relating to the access control point.

8. The system of claim 1 wherein the reader comprises a transmitter for transmitting an interrogation signal for interrogating a radio frequency identification (RFID) tag that is carried by the individual, the RFID tag having stored thereon the authentication data.

9. The system of claim 1 wherein the reader comprises a keypad for receiving a secret code that is input by the individual, and wherein the authentication data comprises the secret code.

10. The system of claim 1 wherein the reader comprises a biometric information sensor, and wherein the authentication data is based on a sensed biometric feature of the individual.

11. A controller unit for an access control system, comprising:

a base portion having a mounting structure for securing the controller unit to a surface at a location proximate an access control point;

circuitry defining an access control panel and a request-to-exit motion sensor, the circuitry being secured to the base portion, and the circuitry that defines the access control panel including communication ports for supporting communication with peripheral devices of the access control system; and a cover portion that is detachably secured to the base portion and that encloses the circuitry defining the access control panel and the request-to-exit motion sensor.

12. The controller unit of claim 11 wherein an opening is defined within a wall along one edge of the cover, the opening sized to accommodate a sensing element of the request-to-exit motion sensor.

13. The controller unit of claim 11 wherein the access control panel is a Power over Ethernet (PoE) device.

14. The controller unit of claim 11 wherein the dimensions of the controller unit are substantially the same as the dimensions of a stand-alone request-to-exit motion sensor.

15. The controller unit of claim 11 wherein the access control panel comprises a display portion for providing human intelligible diagnostic messages relating to a status of the access control system.

16. The controller unit of claim 11 wherein the access control panel comprises a memory portion for storing an event log relating to the access control point.

17. A method for controlling access between a secured side of an access control point and a non-secured side of the access control point, comprising:

providing a reader on the secured side of the access control point for receiving authentication data from an individual;

providing a local controller assembly on the non-secured side of the access control point, wherein the local controller assembly comprises an access control panel and a request-to-exit motion sensor housed within a same housing;

transmitting from the reader to the access control panel a data signal including reader data relating to the authentication data that is received from the individual;

using the access control panel, determining if the individual is authorized to enter the non-secured side of the access control point based on the reader data; and when it is determined that the individual is authorized to enter the non-secured side of the access control point, providing a control signal from the access control panel to an electronic lock mechanism of the access control point, the control signal for changing the lock mechanism from a secured condition to a released condition.

18. The method of claim 17 comprising, when it is determined that the individual is other than authorized to enter the non-secured side of the access control point, other than providing a control signal from the access control panel to the electronic lock mechanism of the access control point, such that the lock mechanism remains in the secured condition and other than changes to the released condition.

19. The method of claim 17 wherein the reader comprises a radio frequency identification (RFID) tag reader, and wherein the authentication data is stored on an RFID tag embedded in a token that is carried by the individual.

20. The method of claim 17 wherein the reader comprises a keypad for receiving a secret code that is input by the individual, and wherein the authentication data comprises the secret code.

21. The method of claim 17 wherein the reader comprises a biometric information sensor, and wherein the authentication data is based on a sensed biometric feature of the individual.

22. The method of claim 17 wherein the access control point is a doorway having a door panel, and wherein the controller unit is disposed vertically above the doorway and is approximately horizontally aligned therewith.

* * * * *